G. W. WATSON AND N. B. LUDLOW.
PRESSED STEEL DETACHABLE WHEEL.
APPLICATION FILED JUNE 2, 1920.
1,387,632. Patented Aug. 16, 1921.
3 SHEETS—SHEET 1.
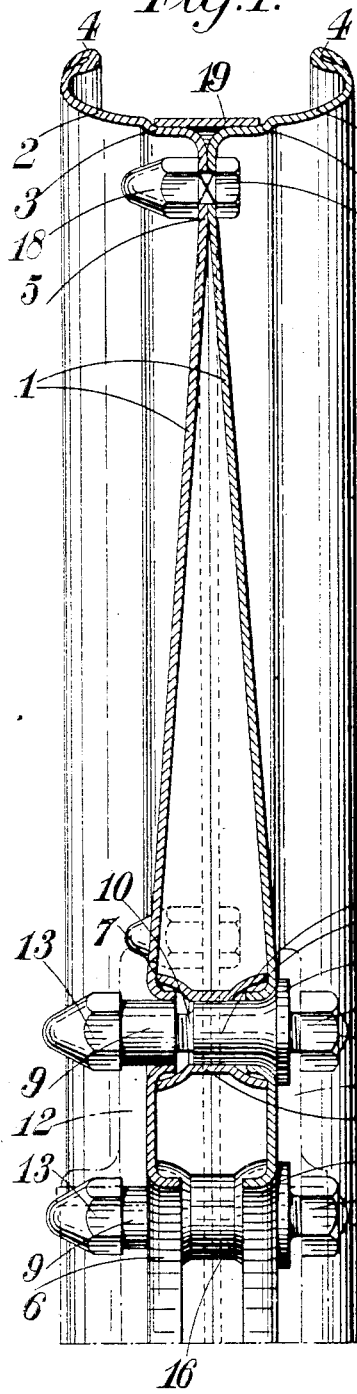
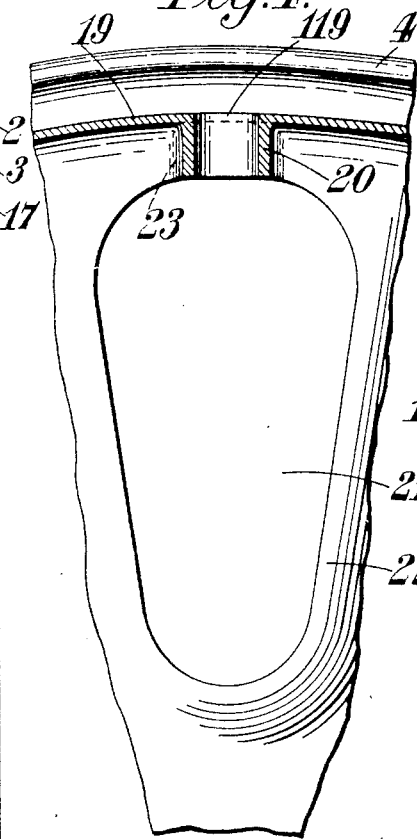
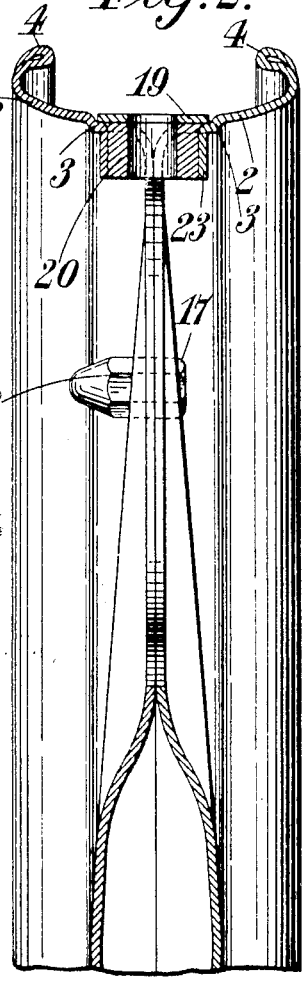
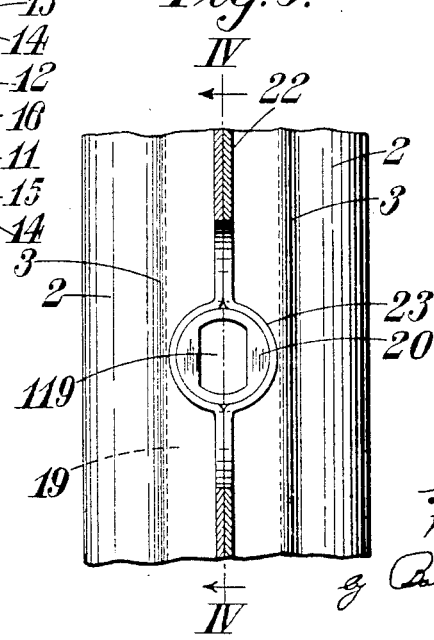
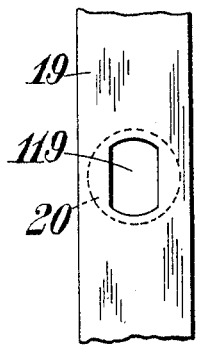
Inventors
George William Watson,
Neville Broughton Ludlow,
by Ashwell Byrnes-Parmelee
their attys.

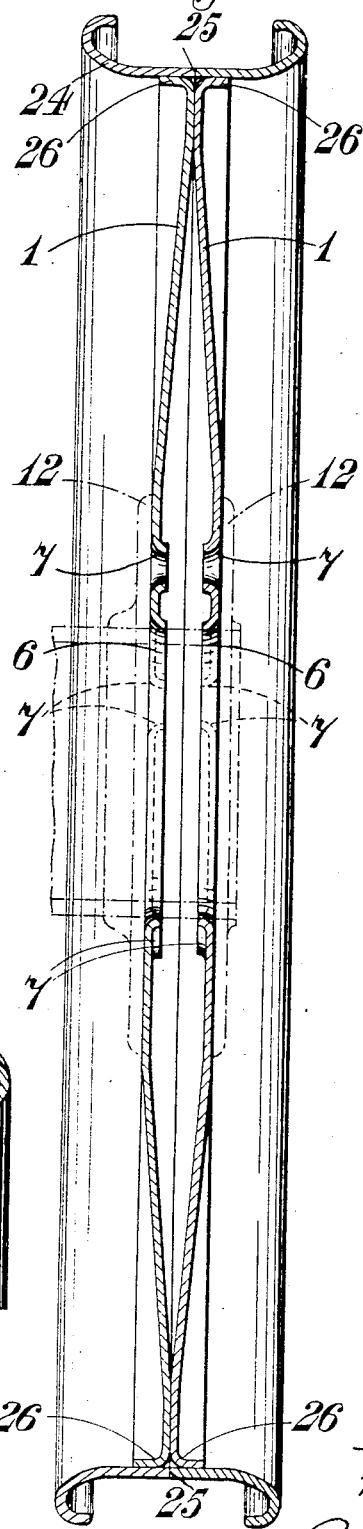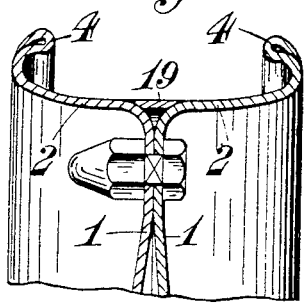

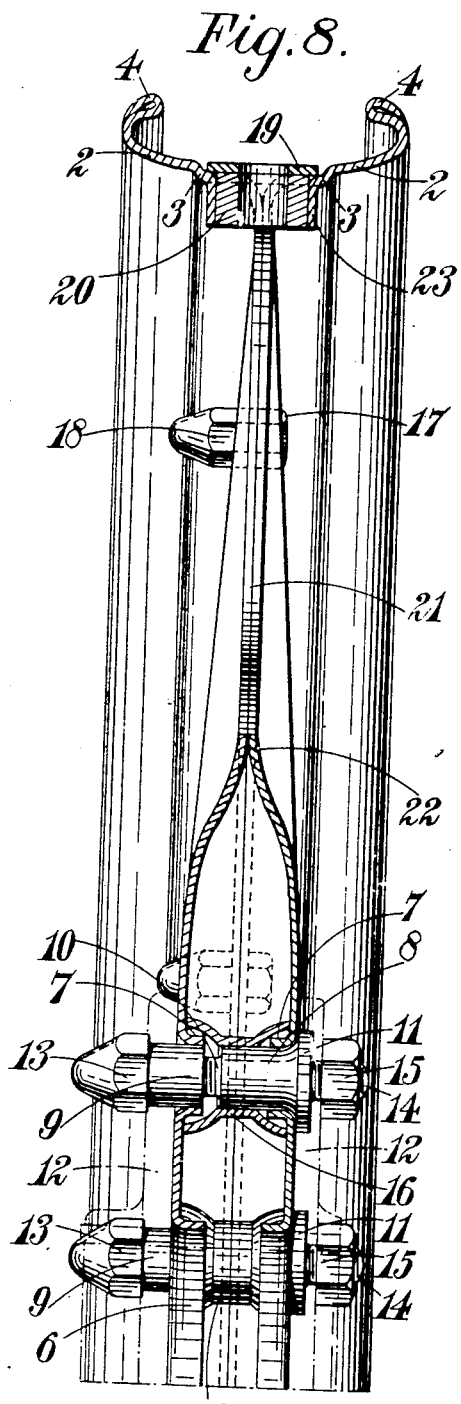

UNITED STATES PATENT OFFICE.

GEORGE WILLIAM WATSON, OF LONDON, AND NEVILLE BROUGHTON LUDLOW, OF WORCESTER, ENGLAND.

PRESSED-STEEL DETACHABLE WHEEL.

1,387,632.   Specification of Letters Patent.   Patented Aug. 16, 1921.

Application filed June 2, 1920. Serial No. 385,978.

*To all whom it may concern:*

Be it known that we, GEORGE WILLIAM WATSON, residing in London, England, and NEVILLE BROUGHTON LUDLOW, residing in Worcester, England, subjects of the King of England, have invented certain new and useful Improvements in Pressed-Steel Detachable Wheels, of which the following is a specification.

This invention is for improvements in or relating to detachable wheels for automobiles and like vehicles.

According to the present invention a detachable wheel comprises in combination two dished wheel-parts held together face-to-face with their concave surfaces opposed to one another, each of which, wheel-parts comprises a dished disk formed with a circumferential flange which extends outwardly from the plane of the wheel and away from the companion disk and is, at its outer margin, turned radially away from the wheel-center to accommodate the edge of a tire together with a band closely encircling both of the said wheel-parts and resting on that portion of each circumferential flange aforesaid which extends outwardly from the plane of the wheel and away from the companion disk.

A feature of the invention comprises a construction in which the said disks are in contact with one another near their outer circumferences, the band encircling both the wheel-parts to bridge across a gap which occurs between the circumferential flanges aforesaid where they turn outwardly from one another and from their respective disks.

Another feature of the invention consists in the wheel-parts having portions removed in the region of the valve and the two disks being so shaped that they are in contact around the margins of the holes when the hole in one of them is in register with the hole in the other.

The invention further includes a method of forming a detachable wheel in two separate parts which consists in taking a rim having the form of a ring which is, at each of its two outer margins turned radially away from the wheel-center to accommodate the edge of a tire and dividing such a rim into two circular parts by a circumferential cut in it intermediate of its two upturned margins, and securing to each part so formed a dished disk.

The foregoing and other features of the invention will be more clearly understood from the following description of several preferred forms of the invention illustrated by way of example in the accompanying drawings in which—

Figure 1 is a partial diametral section through one form of rim;

Fig. 2 is a part section of the same rim through the center of the valve-socket thereon;

Fig. 3 is a view of the inner surface of the rim looking upwardly in Fig. 2;

Fig. 4 is a section on the line IV—IV of Fig. 3;

Fig. 5 is a detail of a portion of the central band;

Fig. 6 is a partial diametral section of a modified construction of rim similar to that illustrated in Figs. 1–5;

Fig. 7 is a diametral section of another modified construction of rim;

Fig. 8 is a partial section through the form of rim shown in Fig. 1.

Like reference numerals indicate like parts in the several figures of the drawings.

Referring first of all to the construction illustrated in Figs. 1–5, the wheel is formed in two similar halves, in each of which the body of the wheel and a trough section rim are together pressed out of a sheet steel disk. Each half consists of a central dished disk-like portion 1, an out-turned flange-portion 2 stepped at 3 and having at its outer margin an upturned and slightly inturned edge 4 shaped to engage the edge of a tire. Each wheel-part is so formed that the two parts will engage one another near the outer peripheries of the disk-portions 1, as shown at 5, but are spaced away from one another in a gradually increasing manner toward the central or hub-portion. Eyes or central orifices are formed at 6 and the marginal portion of each of the orifices is inturned as shown toward the corresponding part in the companion disk. The orifice 6 is of such a size as to fit on to a detachable flanged wheel-hub of known standard construction.

The two wheel-parts are held together by two sets of connecting-devices, one set being near the hub and comprising nuts and bolts and spacing-devices to constitute both ties and struts spaced around the hub at equal intervals. In the example illustrated the disks 1 are formed with holes for the reception of the connecting-devices and the marginal portions of these holes are inturned inwardly as at 7 to afford bearing surfaces for the nuts and bolts respectively. Each connecting-device is similar and comprises a bolt 8 and a nut 9 having cylindrical portions to fit within the inturned edges 7, the nut engaging on a screw-threaded end 10 of the bolt. The bolt 8 is flanged at 11 to engage the outer surface of one of the disks and the flange 11 is received within a recess on the inner face of one of the flanges 12 of the detachable hub. Extending beyond the flange 11 is a screw-threaded projecting end 14 of the bolt 8 and the two flanges 12 and the wheel-parts are drawn together by means of an enlarged head 13 of the nut 9 and a nut 15 engaging the screw-threaded end 14.

The opposed inner faces of the disks 1 are strutted by means of tubular sleeves 16, each of which is formed with a central portion of such dimensions as to constitute a sliding fit on the bolt 8 and with flared end portions within which the inturned edges 7 will be accommodated. Thus, the sleeves 16 resist the compressive stresses imparted to the two wheel-parts by the nuts and bolts 8 and 9.

The other set of connecting-devices for the wheel-parts is disposed near the outer peripheries of the disks 1 and each connecting-device of this set consists of a bolt 17 and a nut 18 whereof the shanks of the bolts are formed of square section and are received in either circular or square-section holes in the disks 1.

An endless band 19 closely encircles both the wheel-parts and rests on those out-turned portions of the latter between the shoulders 3 so as to bridge across the gap which would otherwise occur between the flanges 2 where they turn outwardly from one another and form their respective disks.

In order to accommodate the valve-stem of an inner tube of the tire the band 19 is orificed at 119 and is provided with an inwardly-extending stiffening boss 20 surrounding the orifice 119, see Figs. 2-5. The surfaces of the disks are pressed out to fit closely around the boss 20 as illustrated. Each of the disks 1, in the region of the boss 20, has a portion removed at 21 to provide two holes which, when the wheel-parts are assembled, register with one another. The edges of the removed parts 21 are cut flush with the inner end of the boss 20. The disks are so shaped that when the parts are assembled the disks will be in contact around the margins of the holes 21 to prevent the access of water or grit or other foreign material into the space between the disks. This formation is clearly illustrated in Fig. 2, in which the reference numeral 22 is employed to indicate where the disks are pressed together around the margins of the holes 21 and the reference numeral 23 is used to indicate the portions of the disks which are left to encircle the boss 20.

In Fig. 6 the rim is of the same general construction, with the exception that the stepped portions 3 are omitted, the flanges 2 being smoothly continuous with the disks 1, the band 19 being shaped to close the gap which would otherwise occur between the flanges 2 where they turn outwardly and away from one another and from their respective disks 1.

In order to retain the bolts 17 in place when the nuts are removed, the heads of the bolts may be secured, for example by spot welding to the surface of the disks 1.

Fig. 7 is a diagrammatic illustration of one means for carrying the method according to the present invention into effect. A rim of existing form, such as 24, having the form of a ring with marginal channels or of such form at its margins as to engage the outer edge of the tire, may be taken and divided by a circumferential cut as at 25. To each of the separate rings thus formed is secured a dished disk 1, similar in general form to the dished disks 1 previously described. The disks are flanged at their outer peripheries at 26 and the flanges 26 may be welded to their respective rim-parts.

By securing the heads of the bolt 17, as for example by spot-welding to the disk 1, the bolts remain perfectly rigid after the front wheel-part has been removed, thus facilitating ready replacement of the wheel-part when desired.

Moreover, a wheel constructed as hereinbefore described, can be used as a spare wheel as it is adapted for use with known constructions of standard flanged hub and can be detached therefrom and replaced thereon in precisely the same way as can a wooden or other well known kind of wheel. A further advantage of the invention is that the manufacture of the wheels is considerably simplified and the cost of production reduced by forming each disk and its flanged part by pressing it from a metal disk.

What we claim as our invention and desire to secure by Letters Patent is:—

1. A detachable disk wheel comprising in combination, two dished wheel parts, each of which has at its outer periphery a flange to accommodate the edge of a tire, and each formed with an opening in the disk portion to accommodate the tire valve, the wheel parts being shaped to contact one with the other completely around the margins of the valve opening, and also around the peripheries of the disks, but to be spaced apart at the hub, and means for securing the wheel parts face-to-face to contact one with the other in said manner, said securing means comprising two sets of securing devices, one arranged near the periphery of the wheel, and the other near the hub thereof, substantially as described.

2. A detachable disk wheel comprising in combination, two dished wheel parts, each of which has at its outer periphery a flange to accommodate the edge of a tire, and each formed with an opening in the disk-portion to accommodate the tire valve, the wheel parts being shaped to contact one with the other completely around the margins of the valve opening, and also around the peripheries of the disks, but to be spaced apart at the hub, and means for securing the wheel parts face-to-face to contact one with the other in said manner, said securing means comprising two sets of securing devices, one arranged near the periphery of the wheel, and the other near the hub thereof, with each device of the latter set constituting both a tie and a strut, substantially as described.

3. A detachable disk wheel comprising in combination, two dished wheel parts, each of which has at its outer periphery a flange to accommodate the edge of a tire, and each formed with an opening in the disk-portion to accommodate the tire valve, the wheel parts being shaped to contact one with the other completely around the margins of the valve opening, and also around the peripheries of the disks, but to be spaced apart at the hub, and means for securing the wheel parts face-to-face to contact one with the other in said manner, said securing means comprising one set of securing devices arranged near the outer peripheries of the wheel parts, and a second set in the form of tubular sleeves disposed between the wheel parts around the hub with bolts passing through the sleeves and the said wheel parts and engaged by nuts, substantially as described.

4. A detachable disk wheel comprising in combination, two dished wheel parts, each of which has at its outer periphery a flange to accommodate the edge of a tire, and each formed with an opening in the disk-portion to accommodate the tire valve, the wheel parts being shaped to contact one with the other completely around the margins of the valve opening, and also around the peripheries of the disks, but to be spaced apart at the hub, and means for securing the wheel parts face-to-face to contact one with the other in said manner, said securing means comprising two sets of securing devices, one in the form of bolts and nuts arranged near the outer peripheries of the wheel parts, and the other in the form of tubular sleeves with flared ends disposed between the wheel parts around the hub with bolts passing through the sleeves and the said wheel parts and engaged by nuts, substantially as described.

5. A detachable disk wheel comprising in combination, two dished wheel parts, each of which has at its outer periphery a flange to accommodate the edge of a tire, and each formed with an opening in the disk-portion to accommodate the tire valve, the wheel parts being shaped to contact one with the other completely around the margins of the valve opening, and also around the peripheries of the disks, but to be spaced apart at the hub, and means for securing the wheel parts face-to-face to contact one with the other in said manner, said securing means comprising two sets of securing devices, one in the form of bolts and nuts arranged near the outer peripheries of the wheel parts, and the other in the form of tubular sleeves with flared ends disposed between the wheel parts around the hub, bolt holes in the wheel parts formed with inturned marginal portions inclosed by the flared ends of the said sleeves, and bolts passing through the sleeves and engaged by nuts, substantially as described.

In testimony whereof we have signed our names to this specification.

GEORGE WILLIAM WATSON.
NEVILLE BROUGHTON LUDLOW.